(12) United States Patent
Smith et al.

(10) Patent No.: US 7,533,298 B2
(45) Date of Patent: May 12, 2009

(54) WRITE JOURNALING USING BATTERY BACKED CACHE

(75) Inventors: Gerald Smith, Suwanee, GA (US); Anant Baderdinni, Duluth, GA (US)

(73) Assignee: LSI Corporation, Milpitas, CA (US)

( * ) Notice: Subject to any disclaimer, the term of this patent is extended or adjusted under 35 U.S.C. 154(b) by 467 days.

(21) Appl. No.: 11/220,936

(22) Filed: Sep. 7, 2005

(65) Prior Publication Data

US 2007/0055909 A1 Mar. 8, 2007

(51) Int. Cl.
*G06F 11/00* (2006.01)
(52) U.S. Cl. .......................... 714/20; 714/22
(58) Field of Classification Search .................. 714/20, 714/22
See application file for complete search history.

(56) References Cited

U.S. PATENT DOCUMENTS

| | | | |
|---|---|---|---|
| 6,295,577 B1 * | 9/2001 | Anderson et al. | 711/113 |
| 6,854,038 B2 * | 2/2005 | Micka et al. | 711/156 |
| 6,968,349 B2 * | 11/2005 | Owen et al. | 707/204 |
| 2005/0125586 A1 * | 6/2005 | McCarty et al. | 710/306 |

OTHER PUBLICATIONS

Microsoft Computer Dictionary 4th Ed. 1999, Microsoft Press, p. 372.*

* cited by examiner

*Primary Examiner*—Christopher S McCarthy (57) ABSTRACT

A system, apparatus and method for maintaining information related to a write operation is described. In one embodiment of the invention, a write journal is provided that contains a list of entries that store information related to active write operations so that a particular write may be restarted in order to correct an inconsistency. The journal may have a battery backed cache, in which data is stored prior to writing to a disk, which is provided power in the case of a power failure. The journal may be located in memory positioned at various locations within a system including on a controller card for a disk array system or on a motherboard of a host system.

19 Claims, 6 Drawing Sheets

WRITE JOURNALING USING BATTERY BACKED CACHE

BACKGROUND

A. Technical Field

The present invention relates generally to disk array storage systems, and more particularly, to a method for power failure recovery of pending write operations to a disk array storage system.

B. Background of the Invention

Disk arrays comprising a multiplicity of small inexpensive disk drives connected in parallel have emerged as a low cost alternative to the use of single large disks for non-volatile storage of information. The disk array appears as a single large virtual disk drive to a host system and offers improvements in performance, reliability, power consumption and scalability over a single large magnetic disk. In addition to data, redundancy information is stored within the array so that if any single disk, or portion thereof, within the array should fail, the disk array continues to function without the loss of data. An example of such a disk array is a Redundant Array of Independent Disks ("RAID").

The way of storing the data on a RAID depends on the disk array arrangements. There are several disk array arrangements referred to as RAID levels. A RAID level 1 system comprises one or more disks for storing data and an equal number of additional "mirror" disks for storing copies of the information written to the data disks. The other RAID levels, identified as RAID level 2, 3, 4 and 5 systems, segment the data into portions for storage across several data disks. One or more additional disks are utilized to store error check or parity information either dedicatedly or in combination with the data.

Figure 1:
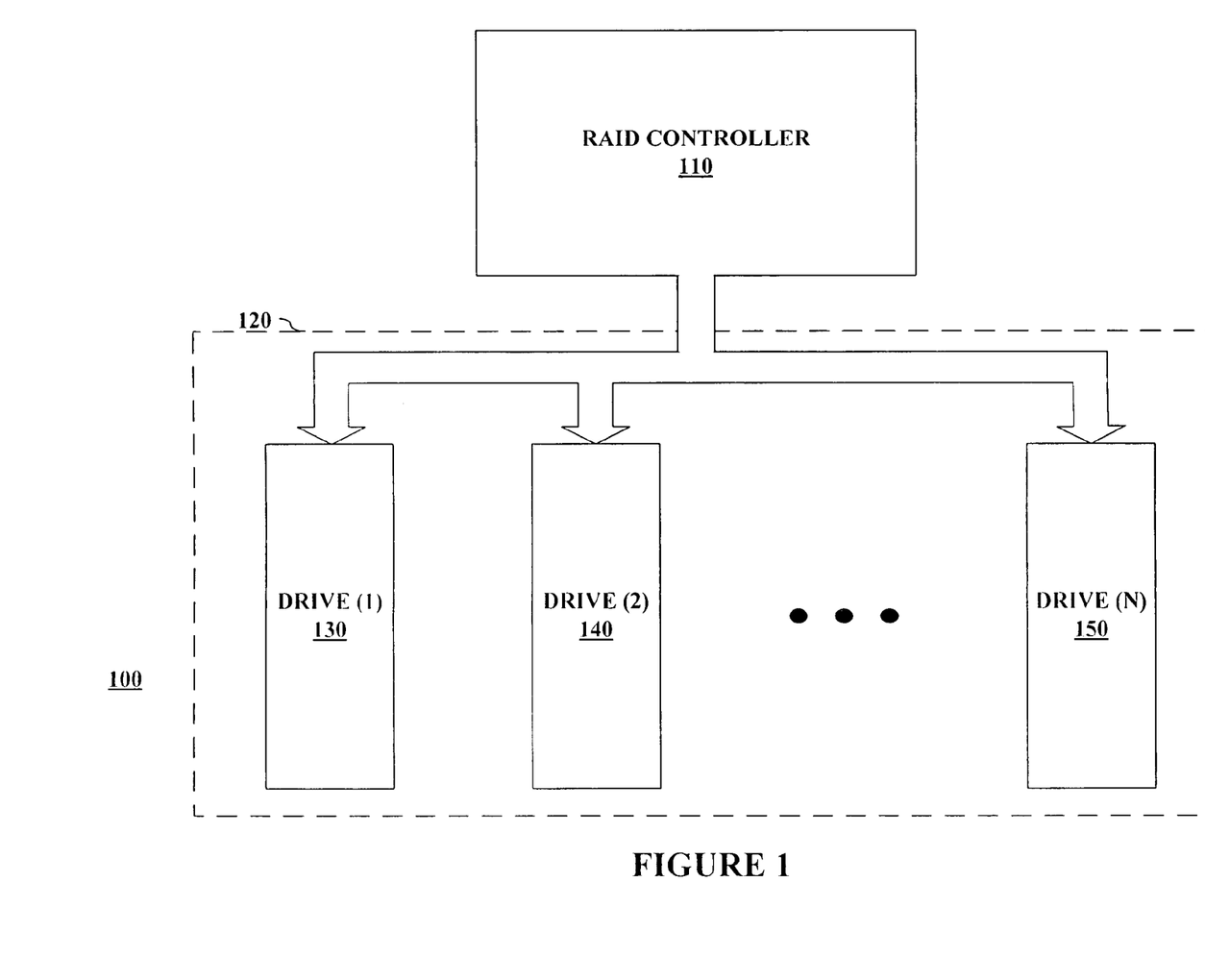
FIG. 1 is an illustration of a RAID storage system, having N number of disk drives, in accordance with one embodiment of the invention.

FIG. 1 illustrates an exemplary RAID system according to one embodiment of the invention. The RAID system includes a RAID controller 110 that functions as an interface between a host or operating system and an array of disks 120. The array of disks contains a first drive 130, a second drive, and up to an $N^{th}$ drive 150 on which data is stored. The RAID controller controls the read and write operations of this data into the RAID 120.

In RAID implementations, writes to disks involve not only writing to data strips; but also generating parity and writing it to a parity strip. The data, in form of blocks, is spread among various disks (N in number) and the parity (or redundancy) information generated from the data can be stored in a dedicated disk or can be spread across all the disks, as is implemented in a RAID 5 implementation.

Figure 2:
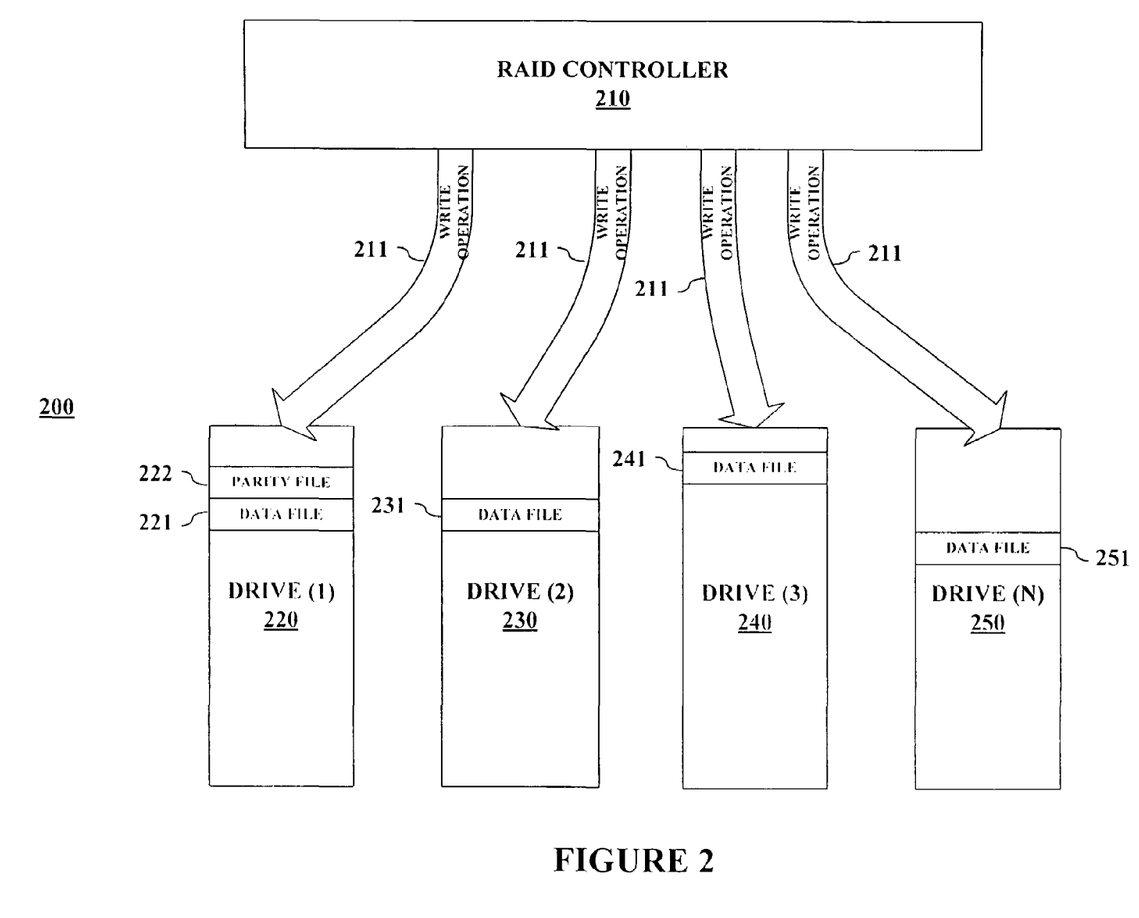
FIG. 2 is an illustration of a RAID 5 write operation in accordance with one embodiment of the invention.

FIG. 2 illustrates an exemplary fault-tolerant RAID 5 in which data and parity is striped intermittently across three or more physical disks according to one embodiment of the invention. As shown, a RAID controller 210 causes multiple write operations 211 to multiple drives 220, 230, 240, 250 in order to store data and provide redundancy thereof. For example, data may be stored in data files or stripes across multiple drives. In this particular example, data is written to a first file 221 on the first drive 220; a second file 231 on the second drive 230; a third file 241 on the third drive 240; and a fourth file 251 on the Nth drive 250. A parity stripe or file 222 is written on the first drive 220.

If a portion or complete failure of a physical disk occurs, the data that was lost or corrupted may be re-created from the remaining data and parity. A single parity strip gets calculated for each strip set. Within each strip set, the parity strip is stored on a different disk, so that there is no single parity-only drive for various reasons including that a dedicated parity drive would represent a bottleneck. This striping of data as well as parity helps in the recreation of data in case of a failed drive scenario.

Data inconsistencies may be generated between data strips and parity in the event of a failure, such as a power failure within the disk array. In particular, data corruption can occur if data and parity become inconsistent due to the array failure, resulting in a false regeneration when data from the failed member disk is subsequently requested by an application. When the writes are issued for data and parity (or mirror) strips, each write is typically performed as an independent write to different disk having no correlation or synchronization there between. An occurrence of power failure in between the two writes leads to inconsistency between the data and the parity (or mirror).

Figure 3:
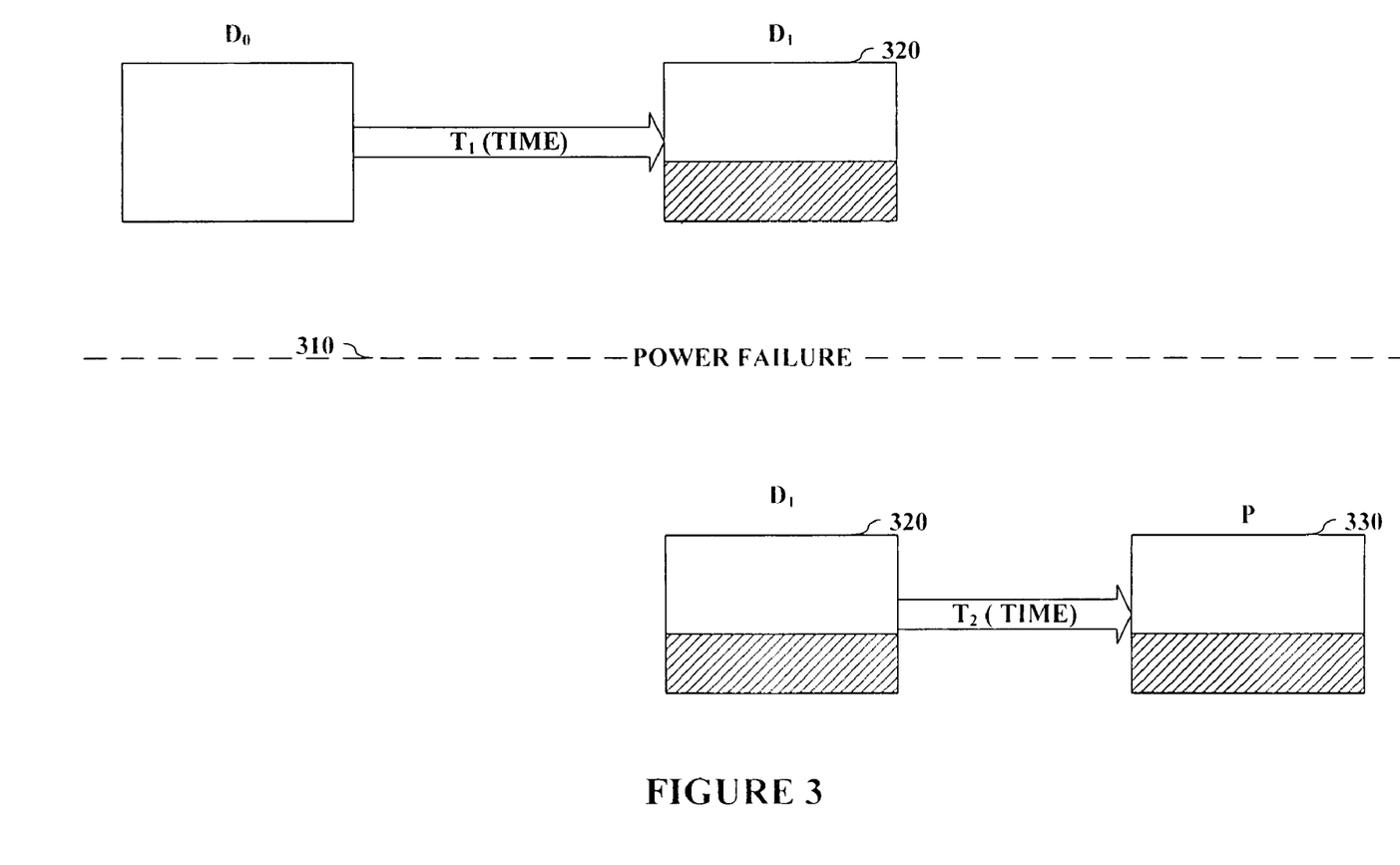
FIG. 3 illustrates an exemplary inconsistency scenario caused by a power failure scenario during a write operation in accordance with one embodiment of the invention.

FIG. 3 illustrates an exemplary write operation to the disk array that was interrupted by a power failure. In response to a write command, data $D_1$ 320 is written to a disk at time $T_1$ and corresponding parity information P 330 is updated on the disk at time $T_2$. If a power failure 310 occurs between time $T_1$ and time $T_2$, the data information written to the disk is updated but parity remains unchanged thereby creating an inconsistency between the data and the parity information associated therewith.

Generally, power failure recovery systems involve keeping track of writes to logical drive by setting a flag in a non-volatile memory while the disk write operation is executing so that in case of a power failure intermittently between individual writes to the disks there is a means of signaling the processor of incomplete writes. The procedure further involves re-computation of parity to make it consistent with data by a running consistency check on the complete drives since no information identifying the disk for which the write was intended is present.

Other methods of power failure recovery include marking the drive inconsistent at boot time, to reduce the computation on parity consistency over complete drive if writes did not complete before the power failure happened. The identified logical drive is then checked for consistency wherein the parity is recomputed if the stripe is found to be inconsistent. However, in a degraded RAID 5 scenario that involves updating data as well as parity, a power failure recovery system as described above renders itself inapplicable because of insufficiency of information on reconstructing data due to the inconsistency in data present because of the degraded disk.

Therefore, a method for safeguarding disk array write operations is required to compensate for inconsistencies between data and parity caused by a power failure prior to completion of a write procedure.

SUMMARY OF THE INVENTION

The present invention provides a method for writing data to the drives of a disk array system enabling improved handling of pending writes in a power failure scenario. The present invention overcomes disadvantages described in the background by maintaining a write journal wherein information for restarting the pending writes is maintained until the complete action of a write to the physical drive completes. In one embodiment of the invention, the journal has a battery backed cache that provides power in the case of power failure. The journal may be located in memory positioned at various locations within a system including on a controller card for the disk array system or on a motherboard of a host system.

The journal has a list of entries in which information about active write operations to a disk or disks may be maintained. In one of the embodiments of the invention, the entries contain information that enables an independent reconstruction of a write operation should a failure occur. For example, an entry for a write operation may include a cache line number, start and end references of the address of the data present in the cache and references of the previous and next entries in the journal. The list within the write journal may also include a header having head and tail pointers to the start and end entries in the list.

In one embodiment of the invention, a journal entry is completed prior to beginning a write operation for a write command. If a power failure occurs during this write operation, the journal entry may be used to perform the write operation again. Thus, any inconsistencies will be corrected after the subsequent write operation has been completed.

Entries within the journal are maintained a sufficient period to ensure that inconsistencies, resulting from such events as a power failure, may be corrected. Accordingly, once a write operation has been completed, the corresponding journal entry will be erased and eventually populated with a new journal entry.

In yet another embodiment of the present invention, write operations are performed only after parity computations have been performed. Thus, a journal entry may be completely updated before the write operation is initiated and the time period in which the actual write operation occurs is reduced. This feature reduces the chance of inconsistencies caused by power failures by shortening the time period in which the write operation is performed.

The present invention also provides a simple yet efficient way of creating and deleting journal entries enabling it to work on various implementations and RAID levels. Furthermore the present invention overcomes the problems of re-computation of parity thus eliminating unnecessary overheads and complexities.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

A system, apparatus and method for maintaining information related to a write operation is described. In one embodiment of the invention, a write journal is provided that contains a list of entries that store information related to active write operations so that a particular write may be restarted in order to correct an inconsistency. The journal may have a battery backed cache, in which data is stored prior to writing to a disk, which is provided power in the case of a power failure. The journal may be located in memory positioned at various locations within a system including on a controller card for a disk array system or on a motherboard of a host system.

In one embodiment of the invention, the journal entry format includes information pointing to storage addresses associated with the write operation (such as a start logical block address ("LBA") and an end LBA). The journal entry may be maintained while the corresponding write operation is pending and then erased after the operation has been completed. This journal entry allows for a relatively simpler re-write operation should a write operation fail.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices including storage environments such as RAID storage systems. The embodiments of the present invention may also be present in software, hardware or firmware. Structures and devices shown below in block diagram are illustrative of exemplary embodiments of the invention and are meant to avoid obscuring the invention. Furthermore, connections between components and/or modules within the figures are not intended to be limited to direct connections. Rather, data between these components and modules may be modified, reformatted or otherwise changed by intermediary components and modules.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

A. System Overview

Figure 4:
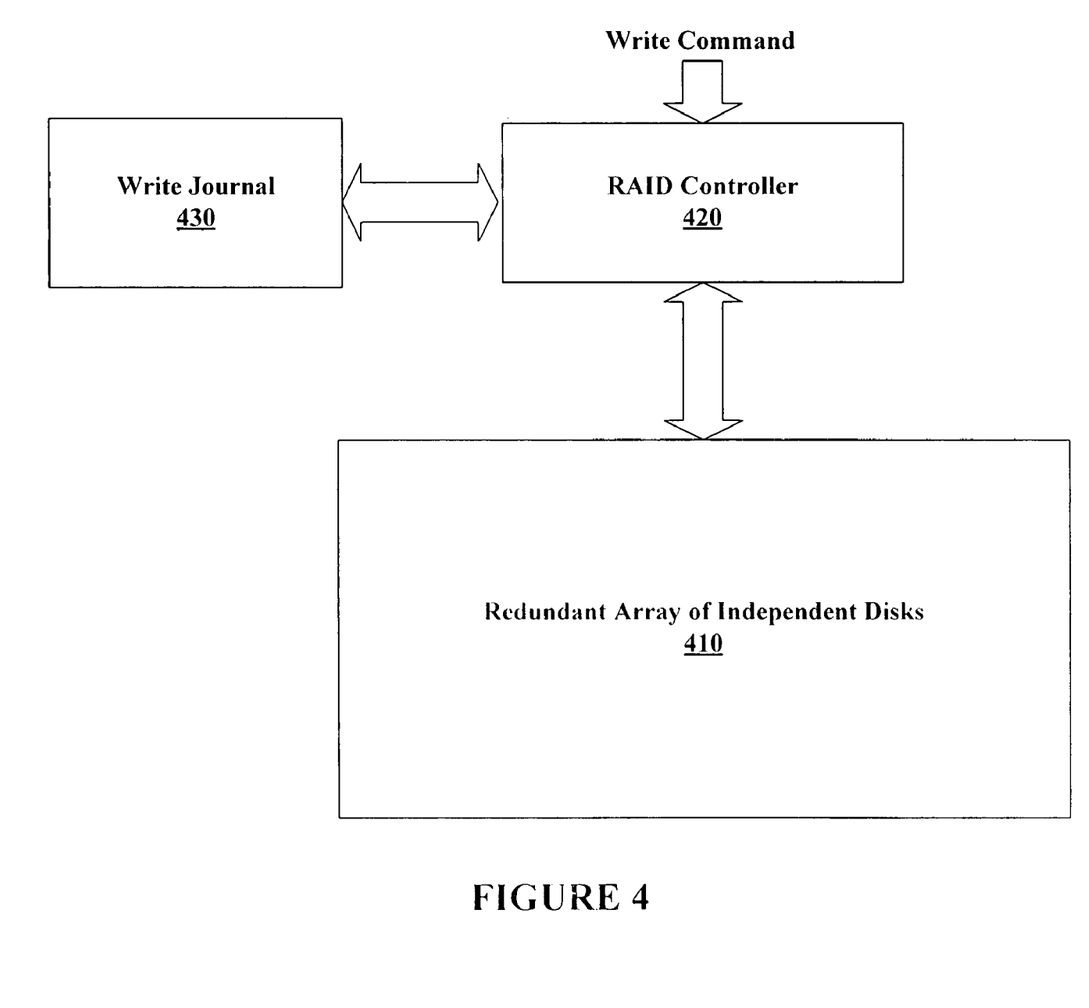
FIG. 4 is a block diagram of a RAID storage system having a battery backed write journal according to one embodiment of the invention.

FIG. 4 is a general block diagram of a RAID system 400 having a write journal 430 according to one embodiment of the invention. A RAID controller 420 operates as an interface between an operating system, from which write commands are sent, to a RAID 410. In one embodiment of the invention, the RAID controller 420 also communicates with the write journal, which may be located on the same card, in order to populate entries within the write journal 430. In another embodiment of the invention (not shown), a write journal may be located within a host system, such as attached to a motherboard and populate entries relative to write commands received directly from the operating system.

The RAID controller 420 receives commands from an operating system and populates an entry within the write journal 430 for each write command that is received. This population includes information that allows for the write command to be restarted in case the initial write operation failed. In one embodiment of the invention, the write journal 430 is created by generating two lists; namely a free list, which contains the empty entries in which information may be provided, and an active list, which consists of the populated entries associated with pending write operations to the disk array 410. Both lists may maintain a header that consists of head and tail pointers to start and ending entries within the lists.

Once a write operation has been completed, the associated entry in the active list may be purged and repopulated with information for another write command. Accordingly, the write journal 430 maintains information a sufficient period of time to ensure that a re-write operation may be performed in case of an operation failure.

B. Write Journal

Figure 5:
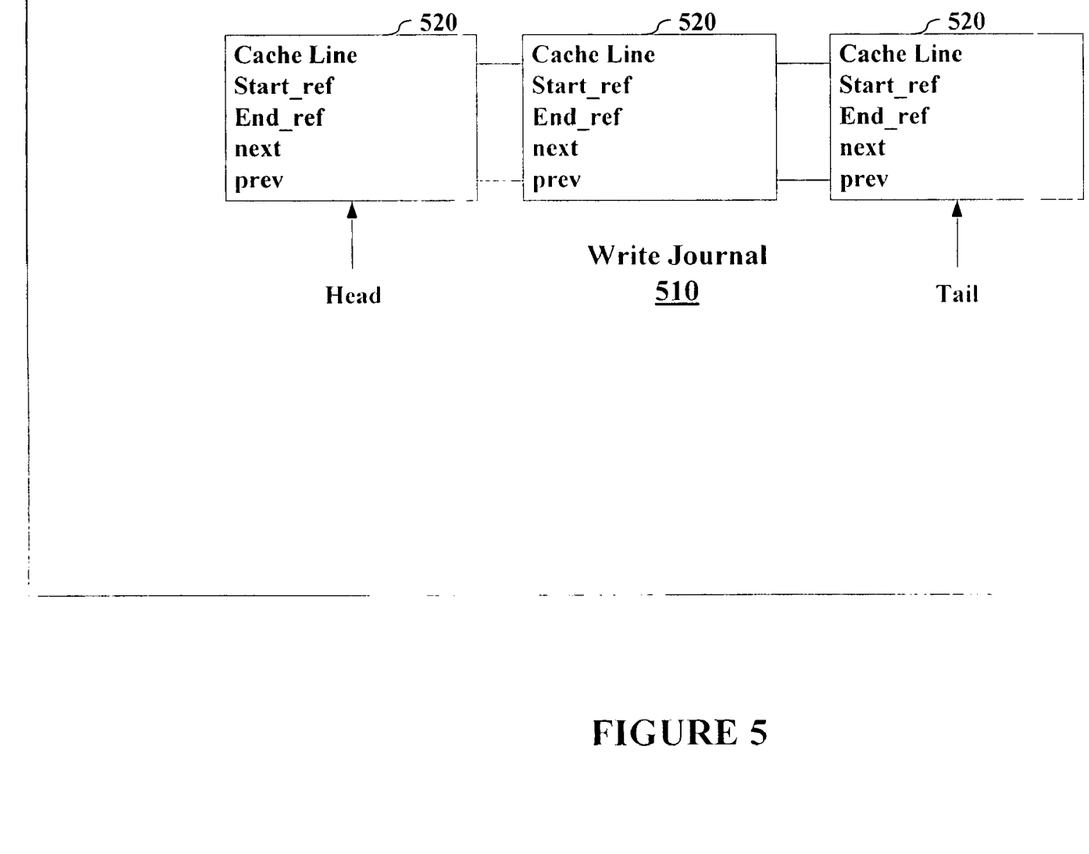
FIG. 5 illustrates an exemplary format for a write journal entry according to one embodiment of the invention.

FIG. 5 illustrates an exemplary journal entry format according to one embodiment of the invention. Data that is to be written on a disk is cached before the actual write operation is performed so that the journal may be updated appropriately. Journal entries 520 within a write journal 510 may include a cache line number, start and end references of the address of the data present in the cache and references of the previous and next entries in the journal. Additionally, a journal entry list may have a header comprising head and tail pointers to the start and ending entries within the list.

The cache line number may refer to the line number within cache pool. A start reference may contain a start address of the disk onto which the data is intended to be written, that is similar to the start LBA of an I/O (Input/Output) request, which may alternately be used in place of the start reference. The end reference contains the reference to the end of the disk address where the information is intended to be stored. As in case of the start reference, the end reference is comparable to the end LBA of an I/O request, which may also be alternately used in place of the end reference. In order to ensure data integrity within the write journal 510, pointers are maintained which contain reference to next and previous entries in the journal list.

C. Opening and Closing Journal Entries

Figure 6:
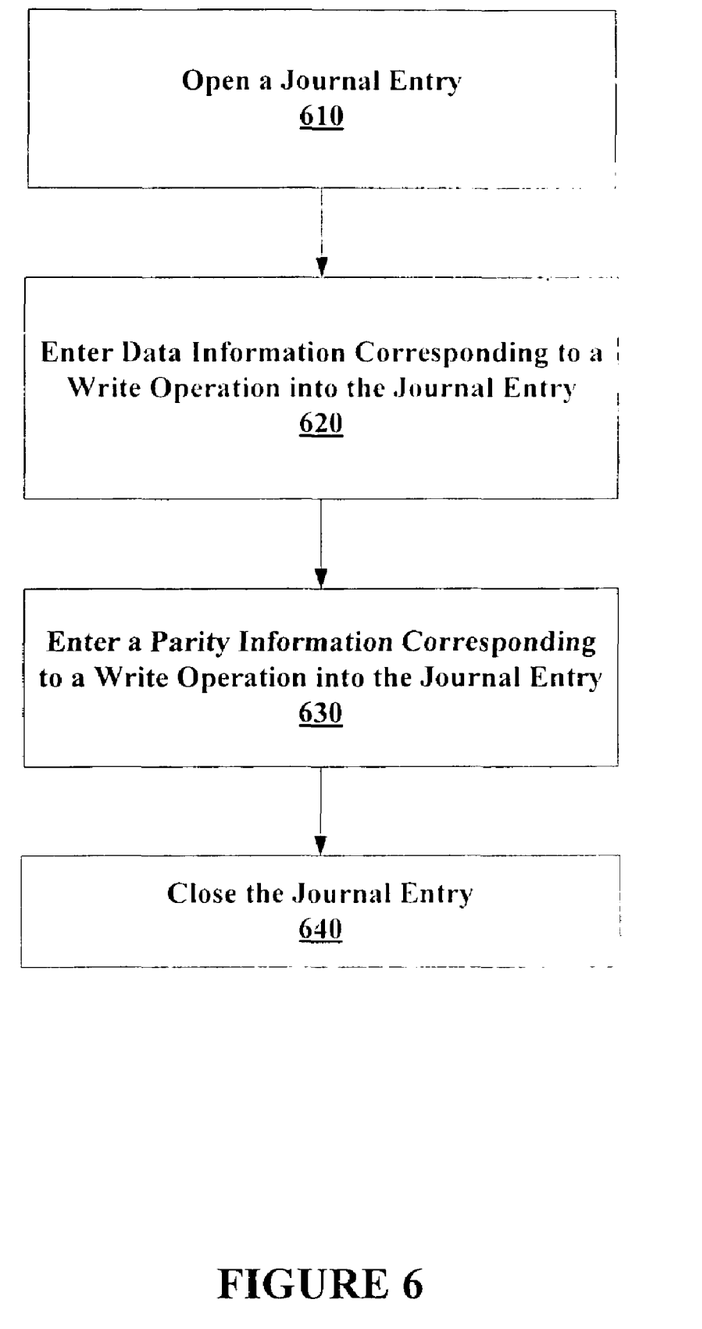
FIG. 6 illustrates a method for populating a journal entry according to one embodiment of the invention.

FIG. 6 illustrates a method of creating an entry in a write journal for a pending write according to one embodiment of the invention. A journal entry is opened 610 for each write operation that is to be performed on a disk array. In one embodiment of the invention, this operation is done as a semaphore operation wherein the active list header is copied onto a temporary header and maintained there until the complete procedure of making an entry to the active list is completed. This has particular implications because in an event of power failure happening before closing of journal, any in-process additions to active journal entries would not have taken effect, since the active header would not have been updated. This effectively protects the journal entry operation for the entire stripe.

In one embodiment of the invention, a journal entry within the free list is populated and moved into the journal's active list. One skilled in the art will recognize that various types of information may be included in the entry to enable a write operation to be restarted should an error occur during the initial write operation. First, data information or a data strip is entered 620 into a journal entry. Additionally, parity information or a parity strip may be entered 630 into the journal entry.

After a journal is entry is complete, the write journal is closed 640. The header information within the active list is updated to include the entries added as shown by the a tail pointer to the end of the parity entry; thereby ensuring successful updating of information in active list for the entire stripe of data as well as parity.

The procedure described above ensures of availability of information required for starting actual write onto the disk arrays at a later instance by a RAID controller. It is noteworthy that in event of a power failure the information stored in the write journal along with the data available in the cache combinatorially represents complete information required for carrying out an actual write procedure.

In one embodiment of the invention, the processing of journal entries at boot-up following a power failure briefly consist of opening the journal, reading the journal by a controller, such as a RAID controller, in order to extract information from the active list and the corresponding data from the cache. Using the information from the active list and cached data, a write operation or operations that are associated with entries in the active list are restarted.

After the completion of the write operation(s) to the disk arrays, the corresponding entry or entries present in the write journal are removed from the active list and moved to the journal's free list. An index of the write journal entries is stored so that when a particular write operation is complete, the journal entry can be directly accessed and removed from active list instead of traversing the list.

While the present invention has been described with reference to certain exemplary embodiments, those skilled in the art will recognize that various modifications may be provided. Accordingly, the scope of the invention is to be limited only by the following claims.

We claim:

1. A method of maintaining information related to a pending write operation to a storage device, the method comprising:
    opening a journal entry after a write operation to the storage device has been received;
    populating the journal entry with data associated with the write operation;
    populating the journal entry with parity information associated with the write operation;
    closing the journal entry; and
    initiating a write procedure to the storage device after the journal entry has been closed.

2. The method of claim 1 wherein the data associated with the write operation is stored within a battery backed cache.

3. The method of claim 2 wherein the battery backed cache is physically located on a controller card for the storage device.

4. The method of claim 2 wherein the battery backed cache is physically located on a motherboard in a host system.

5. The method of claim 1 wherein the journal entry comprises a cache line number, a start reference and an end reference.

6. The method of claim 1 wherein the journal entry comprises a cache line number, a start line block address and an end line block address.

7. The method of claim 1 further comprising the steps of:
    copying an active header for an active list within the write journal to a temporary header;
    updating a pointer, within the temporary header, associated with the journal entry; and
    copying the temporary header back to the active header after the journal entry has been updated.

8. A system for performing a write operation from a host, the system comprising:
    a controller, coupled to communicate with the host, that controls the write operation;
    a disk array, coupled to the controller, on which the write operation is performed and where data is stored;
    a write journal, coupled to communicate with the controller and integrated on a same card as the controller, that maintains information that allows a pending write operation to be reinitiated; and wherein the write journal comprises a battery backed cache in which data associated with the write operation is stored.

9. The system of claim 8 wherein the write journal comprises a free list, an active list and a plurality of headers.

10. The system of claim 9 wherein the active list has an associated header in which a head points to the beginning of the list and a tail points to the end of the list.

11. The system of claim 8 wherein a battery that powers the battery backed cache is integrated on a controller card.

12. The system of claim 8 wherein the disk away is a Redundant Array of Independent Disks.

13. A computer program product embodied on a computer readable storage medium for maintaining information related to a pending write operation to a storage device, the computer program product comprising computer instructions for:
    opening a journal entry after a write operation to the storage device has been received;
    populating the journal entry with data associated with the write operation;
    populating the journal entry with parity information associated with the write operation;
    closing the journal entry; and
    initiating a write procedure to the storage device after the journal entry has been closed.

14. The computer program product of claim 13 wherein the data associated with the write operation is stored within a battery backed cache.

15. The computer program product of claim 14 wherein the battery backed cache is physically located on a controller card for the storage device.

16. The computer program product of claim 13 wherein the journal entry comprises a cache line number, a start reference and an end reference.

17. The computer program product of claim 13 wherein the journal entry comprises a cache line number, a start line block address and an end line block address.

18. The computer program product of claim 13 further comprising computer instructions for:
    copying an active header for an active list within the write journal to a temporary header;
    updating a pointer, within the temporary header, associated with the journal entry; and
    copying the temporary header back to the active header after the journal entry has been updated.

19. The computer program product of claim 13 wherein the storage device is a Redundant Array of Independent Disks.

* * * * *